W. D. PARKER.
Ice House for Preserving Meats, &c.
No. 13,098. Patented June 19, 1855.
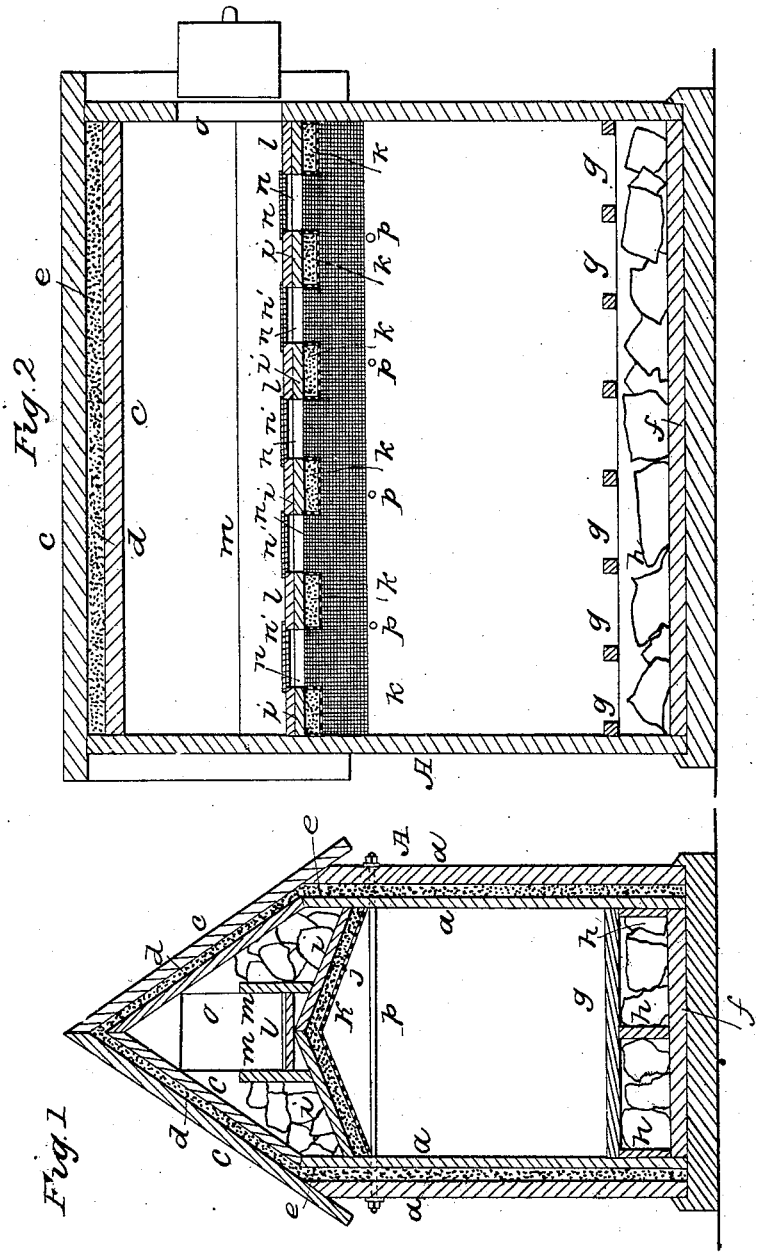

UNITED STATES PATENT OFFICE.

W. D. PARKER, OF NEW YORK, N. Y.

ICE-HOUSE.

Specification of Letters Patent No. 13,098, dated June 19, 1855.

*To all whom it may concern:*

Be it known that I, W. D. PARKER, of the city, county, and State of New York, have invented a new and Improved Ice-House for Preserving Fruits, Vegetables, Meats, &c.; and I do hereby declare that the following is a full, clear, and exact description of the same, reference being had to the annexed drawings, making a part of this specification, in which—

Figure 1, is a transverse vertical section of my improvement. Fig. 2, is a longitudinal vertical section of ditto.

Similar letters of reference indicate corresponding parts in the two figures.

The nature of my invention consists in the peculiar construction of the ice house, as will be presently shown and described whereby articles intended for preservation are kept at a low and even temperature, and free from all moist and impure vapors.

To enable others skilled in the art to fully understand and construct my invention, I will proceed to describe it.

A, represents the ice house, which may be of any proper form. The sides of the house are double, formed of two sides $a$, $a$, a space $b$ of suitable width being allowed between them. The roof is also formed of two thicknesses $c$, $c$, a space $d$, being allowed between them, the spaces $b$, $d$, are filled or well packed with sawdust $e$ or other nonconducting substance.

A short distance above the bottom $f$ of the ice house there is a slatted floor, $g$. The slats rest upon proper supports $h$ and the space between the slats and the bottom $f$ forms an ice chamber.

Just below the upper ends of the sides $a$, $a$, there is secured a double inclined flooring $i$, $i$, the highest point of which is at the center of the house and inclining downward toward each side of the house, as shown clearly in Fig. 1, and directly underneath this flooring there is placed a wire screen $j$, a space being allowed between the screen and flooring. This space is filled with charcoal $k$ and other proper absorbent. Over the highest point of the flooring $i$, $i$, there is placed a narrow horizontal flooring $l$, which has upright sides $m$, $m$, and through the flooring $l$ and screen $j$, there are made holes or traps $n$, which may be provided with doors $n'$. At one end of the house at its upper part there is a door $o$. The sides of the house are kept firm, or prevented from spreading under the thrust or pressure of the roof by means of the rods $p$.

The space or ice chamber between the slatted floor $g$ and the bottom $f$ of the ice house is filled with ice, and ice is also placed on the inclined flooring, $i$, $i$, on the outer sides of the upright sides, $m$, $m$, of the flooring, $l$, see Fig. 1.

The articles to be preserved are hoisted up to the door $o$ and placed upon the flooring $l$ and lowered down through the holes or traps $n$ upon the slatted floor $g$, and as the holes or traps extend along the whole length of the flooring $l$, the house may be filled or the articles stored within the house in a proper manner.

When the door $o$ is open, the doors $n'$ are closed, and when the flooring $l$ is covered the door $o$ is closed and the doors $n'$ opened and the articles lowered into the house, by not keeping the door $o$ and the doors $n'$ open at the same time the lower chamber is kept free from atmospheric influence and change of temperature.

The sawdust or other nonconducting filling $e$, together with the ice keeps the house at a low temperature, the filling keeping the interior of the house free from atmospheric influence. The charcoal and other absorbent keeps the house dry by absorbing moisture and gas vapor arising from the articles to be preserved.

The house is placed entirely above the ground, and may be constructed of any proper material, wood would probably be preferable. In case of the melting of the ice proper pipes may be inserted to carry away the water, and the floors on which the ice is placed may be properly inclined for that purpose.

Different absorbents $k$ may be used according to the nature of the articles to be preserved. The absorbents may be readily removed and adjusted upon the screen $j$, the screen being movable or arranged in any proper way.

I do not claim making an ice house with double sides, and packing a nonconducting substance betwen the sides, for that is a well known mode of construction, but

What I claim as new and desire to secure by Letters Patent, is,

The construction of the ice house as herein shown and described, viz, having the ice house formed with double sides $a$, $a$, and double roof $c$, $c$, with a suitable nonconducting substance packed between them, the house being provided with a slatted floor $g$, having an ice chamber underneath it, and also provided with a double inclined floor $i, i$, at its upper part underneath which a screen, $j$, is secured, on which charcoal and other absorbents $k$, are placed, a flooring $l$ being placed on the flooring $i, i$, and having holes or traps $n$ provided with doors $n'$ made through it, and also through the flooring $i, i$ and screen $j$, the flooring $i, i$ also containing ice, substantially as herein described and for the purpose set forth.

W. D. PARKER.

Witnesses:
 JAS. GEO. MASON,
 WM. TUSCH.